3,390,113
BRAKE BLOCK COMPOSITIONS COMPRISING VULCANIZED HALOGENATED BUTYL RUBBER
Charles Louis Ernest de Gaugue, Califon, N.J., assignor to Johns-Manville Corporation, New York, N.Y., a corporation of New York
Continuation-in-part of application Ser. No. 198,156, May 28, 1962. This application Jan. 27, 1967, Ser. No. 632,120
12 Claims. (Cl. 260—23.7)

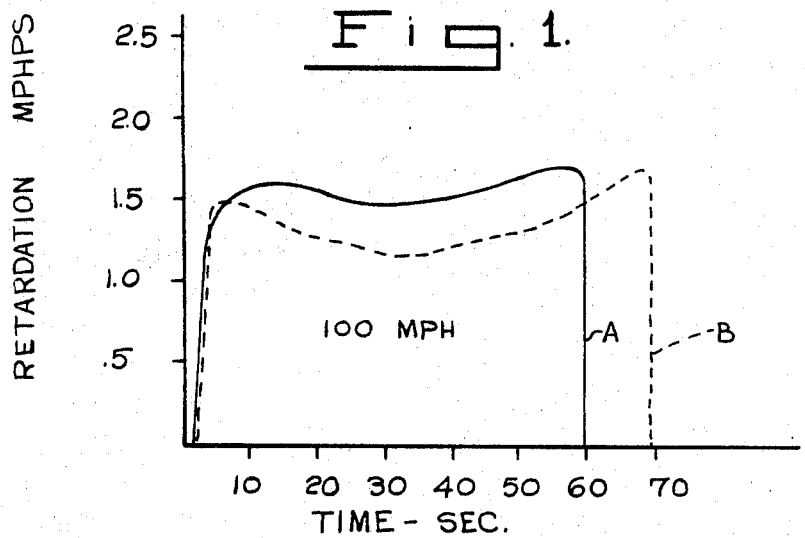
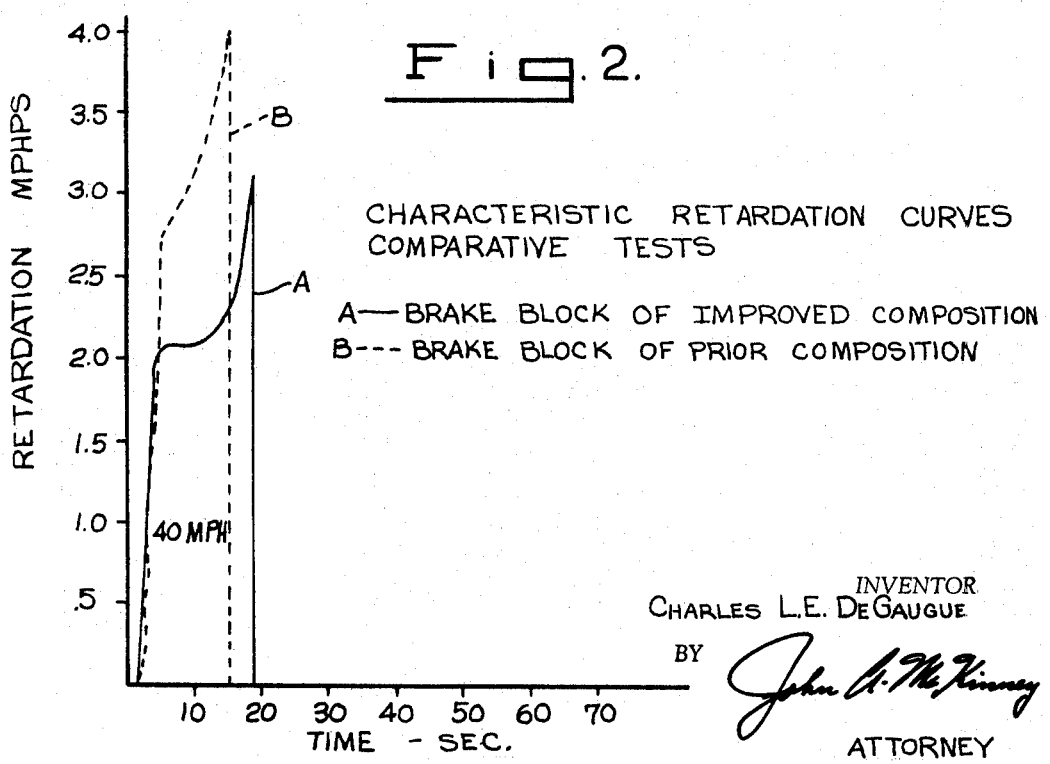
CHARACTERISTIC RETARDATION CURVES
COMPARATIVE TESTS
A—— BRAKE BLOCK OF IMPROVED COMPOSITION
B--- BRAKE BLOCK OF PRIOR COMPOSITION

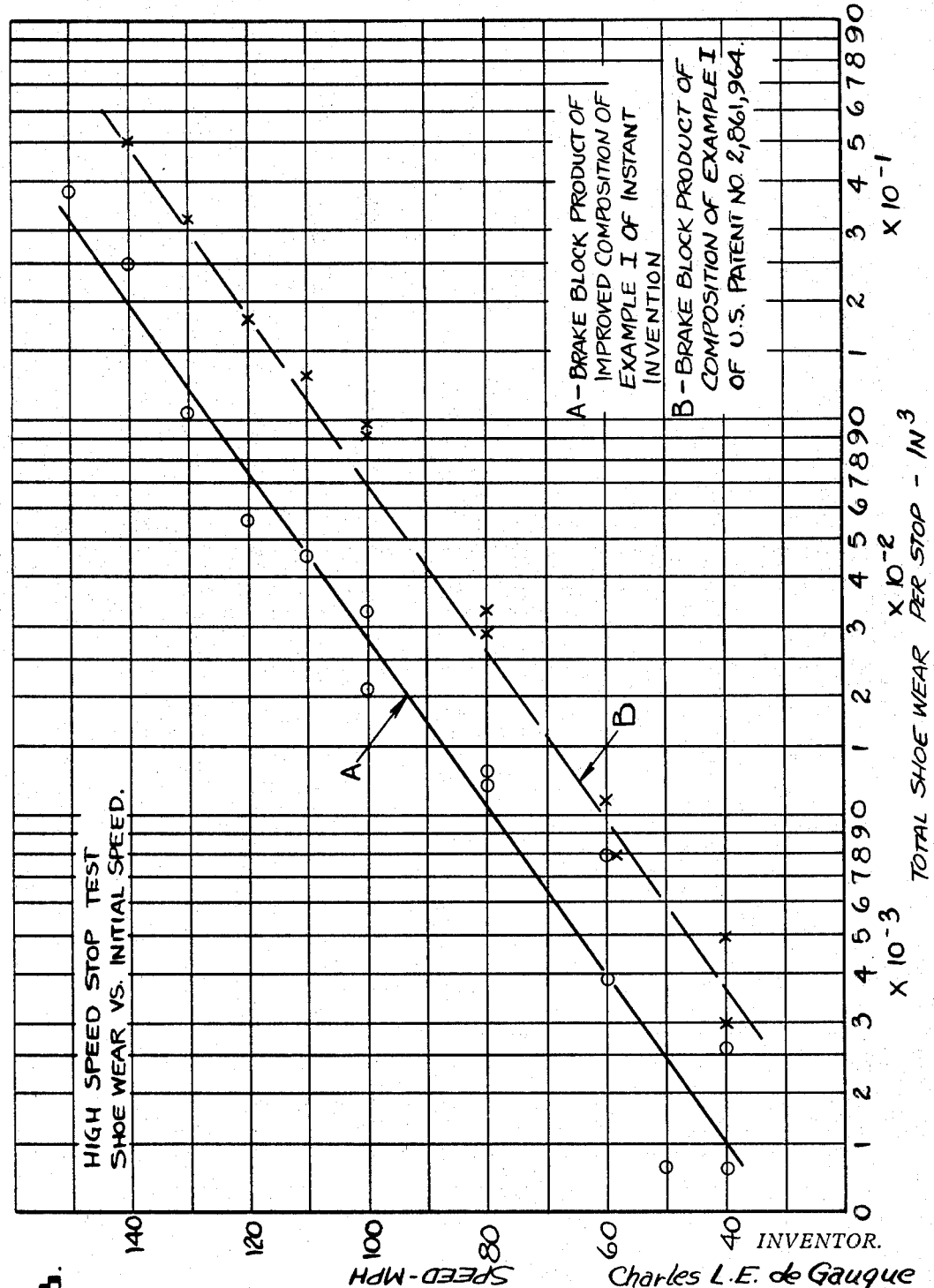

ABSTRACT OF THE DISCLOSURE

A heavy duty brake block composition containing hard ferrous metal particles, non-ferrous inorganic and organic fillers, and an organic binder matrix comprising a heat resistant, vulcanized in situ halogenated butyl rubber.

CROSS-REFERENCE TO RELATED APPLICATION

This application is a continuation-in-part application of my copending U.S. patent application Ser. No. 198,156, filed May 28, 1962, now abandoned.

BACKGROUND OF THE INVENTION

This invention relates to improved composition brake blocks, and more particularly to enhanced molded brake block compositions of the general type disclosed and claimed in U.S. Letters Patent No. 2,686,140 and No. 2,861,964 which are peculiarly adaptable for braking heavy equipment such as railroad rolling stock.

Patents No. 2,686,140 and No. 2,861,964 are concerned with a new concept in railroad brake blocks, a unique combination of cast iron particles and organic constituents bonded with highly filled, hard, rubbers of the given compositions which provide decidedly improved advantages including enhanced braking and friction properties with both longer block or friction element and wheel tread or drum wear over the long utilized solid cast iron brake blocks for railroad application.

This invention comprises the discovery of a new composition for railroad brake blocks of the general type and/or general components described in Patents No. 2,686,140 and/or 2,861,964, which results in further marked enhancements and improvements of certain basic properties of the former composition brake blocks of either of the said patents. In particular, the modified and improved composition brake blocks of this invention, primarily attributable to and constituting a new and enhancing binder phase or matrix, exhibit general overall properties at least equivalent to those of the prior art as represented by the aforementioned patents and decidedly improved properties comprising a substantially increased wear life, more uniform and greater friction characteristics, and the reduction of loud and/or disagreeable noises during or resulting from braking which is of considerable importance in passenger service, particularly in subway or interurban passenger service wherein stops are frequent and the noise of braking confined or concentrated by the ambient conditions.

SUMMARY OF THE INVENTION

In general, this invention comprises improved composition brake blocks of the same general construction and compositions as those of Patents No. 2,686,140 and No. 2,861,964 containing a binder phase or matrix comprising halogenated butyl rubber, or more precisely a halogenated elastomer produced by copolymerization of isobutylene with relatively small amounts of isoprene at low temperatures. The balance of the friction composition of this invention like those of the Patents No. 2,686,140 and No. 2,861,964, typically comprise approximately 20 to 75% by weight of hard ferrous metal at least 50% of which is in the form of cast iron particles together with at least 50% by volume of non-ferrous inorganic and organic filler and the organic binder. The effective binder systems of this invention consist of halogenated butyl rubber elastomers containing a halogen comprising chlorine and/or bromine such as chlorobutyl rubber and bromobutyl rubber. The preferred rubber material, primarily due to its superior molding characteristics, consists of a chlorobutyl rubber or elastomeric isobutylene isoprene copolymer containing about 1.1 to 1.3% of reactive chlorine and produced pursuant to the disclosure of U.S. Letters Patent No. 2,944,578.

Objects and advantages of this improved composition for brake blocks or elements of this invention comprise greater block or element wear life of up to about three times greater than prior compositions without an increase in wear of the cooperating braking surface of the wheel tread or brake drum, and improved higher and more uniform friction properties along with good wet and dry frictional characteristics comparable to prior brake blocks. Although these attributes are present when braking from any speed, they are most pronounced under high speed conditions of up to 150 m.p.h. Moreover the new composition brake blocks or elements of this invention do not emit or produce typical or characteristic braking squeals or the like disagreeable noise and vibrations when contacting and/or compressed upon the cooperating wheel tread or brake drum surface.

The above and other objects and advantages of the improved composition or new binder system of this invention will become more apparent in the hereinafter detailed description and drawing wherein the FIGS. 1 and 2 illustrate comparable retardation rates or characteristics upon braking from speeds of 100 miles per hour and 40 miles per hour with brake blocks of this invention and with the preferred and commercial composition brake blocks of the prior art consisting of the product of Example I of Patent No. 2,861,964. FIG. 3 comprises a graph illustrating the relative wear rates of the composition of Example I of this invention with that of Example I of Patent No. 2,861,964 constituting a preferred, commercial product of the prior art. All braking conditions were the same and the abscissa axis denotes speed and the ordinate axis the rate of wear in cubic inches in logarithmic scale.

DESCRIPTION OF PREFERRED EMBODIMENTS

The composition brake block products of this invention are produced by utilizing halogenated butyl rubbers of the types specified in amount of about 5 to 12% and preferably about 6 to 10% by weight of the overall block which are vulcanized or cured in situ with curing agents, fillers, etc. to form the bonding phase or system constituting an encompassing matrix for other components. The overall binder systems or phases include along with the rubber approximately 2 to 20% by weight of the block of inorganic and organic fillers and vulcanizing ingredients such as sulfur, or tetramethylthiuram disulfide or polymethylol phenol resin or other apt curing agents, magnesium oxide, zinc oxide, carbon black, barytes, etc., providing a bonding and encompassing matrix of about 8 to 35% by weight of the total block. And in addition to the fundamental halogenated butyl rubber in the specified amounts, these brake blocks may also include other rubber compositions in the binder system such as butyl rubber compatible butadiene-styrene rubber and other compatible elastomers. When combined with other rubbers or elastomers, the halogenated butyl rubber of the binder of this invention must consist of at least 2% by weight of the overall block, and the total rubber binder component should not exceed about 15% by weight of the block.

The method or means of producing and/or molding the subject brake blocks of this invention are not unlike those of the foregoing mentioned patents and are pursuant to established rubber compounding and brake block manufacturing procedures and techniques. For example, the rubber component with the fillers and/or vulcanizers and the like are blended on a rubber mill and cut back with a suitable solvent such as gasoline to form a uniform and workable fluid-like consistency whereupon the other constituents are combined and blended therewith. The admixture of the complete formulation is then formed into small particles or pellets which are dried at a relatively low temperature if necessary to provide a convenient and handleable particulate furnish for molding. The material is then molded at high pressures and elevated temperatures, e.g., about 2000–5000 p.s.i. and 300–400° F., to shape and integrate the brake block article whereupon it is baked at an appropriate temperature, e.g., about 250–400° F., to complete the cure or vulcanization.

Molded composition brake blocks of a formulation in accordance with this invention, viz., composition brake blocks such as generally disclosed in Patent No. 2,686,140 and/or No. 2,861,964, but comprising therein a vulcanized in situ halogenated butyl rubber in amount of at least about 2 up to about 12% by weight of the product selected from the group consisting of chlorobutyl rubber, and bromobutyl rubber, or mixtures thereof, exhibit improved higher and more uniform frictional characteristics, significantly greater wear resistance or service life without a commensurate increased rate of wear or reduced service life on the cooperating or brake contacting wheel tread, brake drum or other contacting brake surface, and exceptionally quiet braking properties without incurring adverse qualities or materially diminishing other essential properties of comparable prior art products. As is apparent these improved properties render such a brake block particularly advantageous and useful in high speed passenger service and on subway and interurban service systems.

The organic friction particles and thermosetting resin stiffener referred to throughout this specification comprise conventional frictional material constituents such as described and illustrated in Patents Nos. 2,868,140 and 2,861,964, and related prior art. For example, the organic friction particles may comprise common heavily filled, hard, prevulcanized rubber friction particles, or conventional resinous friction particles such as granules of cured thermosetting resins as exemplified by polymerized cashew nut shell oil. Such organic friction particles are preferably included in amounts of from approximately 10 to 60% by weight of the composition and typically in amount of about 40 to 50%. And the rubber matrix or binder phase can be stiffened with up to about 6% by weight of the overall block with a thermosetting resin such as phenolic resins, polymethylol phenol resins or halogenated butyl compatible resins. The friction particles of the hereinafter specific examples consist of the heavily filled hard vulcanized rubber variety of a composition approximating that illustrated in Patent No. 2,686,140. The compositions also preferably include reinforcing fiber in amounts up to approximately 30% by weight of the composition.

The following examples illustrate suitable and preferred railroad brake block compositions including various halogenated butyl rubbers in accordance with this invention. It is to be understood that the manufacturing or processing means and techniques, and the particular constituents of the illustrated brake blocks, other than the novel halogenated butyl elastomer binders, are exemplary and are not to be considered to limit this invention to any specific product, formulation, or composition recited in the hereinafter examples.

Exemplary brake blocks comprising the hereinafter given formulations were prepared as follows: The appropriate identified halogenated butyl rubber components were combined on a rubber mill with the given proportions of a conventional curing agent comprising either sulfur or tetramethylthiuram disulfide or polymethylolphenol resin accelerators, stearic acid, zinc oxide or the like appropriate rubber compounding constituents given. The resultant compounded rubber sheet was chopped and tumbled with gasoline until a smooth, consistent cement was formed which was placed in a sigma-blade mixer and combined with the balance of the constituents of the particular formulation producing a dough-like extrudable mass. Upon pelleting the mixture, or chopping or slicing the material into small bodies, the particles thereof were thoroughly dried at a temperature just under about 130° F. to provide a convenient particulate furnish for charging and molding in compression type molds such as are frequently utilized in the production of composition blocks. The dried pellets were compression molded for a period of about 1 hour at mold temperatures of approximately 300° F. and unit compressive loads of approximately 3000 pounds per square inch. Upon removal from the mold, the resulting shaped and consolidated brake blocks were subjected to an after-bake of about 12 hours at approximately 300° F. to complete the vulcanization or cure.

In each of the hereinafter examples the composition is given in percentages based upon weight, and additionally in some cases by parts by weight, or percent by volume.

EXAMPLE I

| | Percent by wt. | Parts by wt. | Approx. vol. percent |
|---|---|---|---|
| Chlorobutyl rubber (Enjay HT-1066) | 7.62 | 100 | 20 |
| Accelerator, tetramethylthiuram disulfide ("Tuads") | 0.08 | 1 | 1 |
| Accelerator, benzothiazyl disulfide ("Altax") | 0.08 | 1 | 1 |
| Stearic acid | 0.08 | 1 | 1 |
| Zinc oxide | 0.38 | 5 | 1 |
| Carbon black, powdered | 4.56 | 60 | 6 |
| Cast iron chips (substantially 100–200 mesh) | 30.50 | 400 | 9½ |
| Friction particles (hard, heavily filled, vulcanized rubber) | 48.80 | 640 | 50 |
| Cellulose floc | 7.90 | 104 | 13½ |
| Total | 100.00 | 1,312 | |

EXAMPLE II

| | Percent by weight |
|---|---|
| Chlorobutyl rubber (Enjay MD–551) | 7.57 |
| Sulfur | 0.15 |
| Accelerator, tellurium diethyldithiocarbamate ("Tellurac") | 0.08 |
| Accelerator, benzothiazyl disulfide ("Altax") | 0.08 |
| Stearic acid | 0.08 |
| Zinc oxide | 0.75 |
| Carbon black, powdered | 4.60 |
| Cast iron chips (substantially 100–200 mesh) | 30.33 |
| Friction particles (hard, heavily filled, vulcanized rubber) | 48.50 |
| Cellulose floc | 7.86 |
| Total | 100.00 |

EXAMPLE III

| | Percent by weight |
|---|---|
| Bromobutyl rubber (Hycar 2202) | 7.57 |
| Sulfur | 0.15 |
| Accelerator, tellurium diethyldithiocarbamate ("Tellurac") | 0.08 |
| Accelerator, benzothiazyl disulfide ("Altax") | 0.08 |
| Stearic acid | 0.08 |
| Zinc oxide | 0.75 |
| Carbon black, powdered | 4.60 |
| Cast iron chips (substantially 100–200 mesh) | 30.33 |

EXAMPLE III—Continued

| | |
|---|---|
| Friction particles (hard, heavily filled, vulcanized rubber) | 48.50 |
| Cellulose floc | 7.86 |
| Total | 100.00 |

EXAMPLE IV

| | Percent by weight |
|---|---|
| Chlorobutyl rubber (Enjay MD-551) | 8.50 |
| Sulfur | 0.20 |
| Accelerator, tellurium diethyldithiocarbamate ("Tellurac") | 0.10 |
| Accelerator, benzothiazyl disulfide ("Altax") | 0.10 |
| Stearic acid | 0.10 |
| Zinc oxide | 1.00 |
| Carbon black, powdered | 5.00 |
| Cast iron chips (substantially 100–200 mesh) | 30.00 |
| Friction particles (hard, heavily filled, vulcanized rubber) | 43.00 |
| Asbestos fiber | 12.00 |
| Total | 100.00 |

EXAMPLE V

| | Percent by wt. | Parts by wt. |
|---|---|---|
| Chlorobutyl rubber (Enjay HT-1066) | 8.00 | 100 |
| Accelerator, benzothiazyl disulfide ("Altax") | .16 | 2 |
| Accelerator, tetramethylthiuram disulfide ("Tuads") | .08 | 1 |
| Stearic acid | .08 | 1 |
| Magnesium oxide | .16 | 2 |
| Zinc oxide | 1.60 | 20 |
| Phenolic resin (Durez 12687) | 1.92 | 24 |
| Carbon black | 4.80 | 60 |
| Cast iron chips | 28.80 | 360 |
| Friction particles (hard, heavily filled, vulcanized rubber) | 48.00 | 600 |
| Asbestos fiber 7-D-02 | 6.40 | 80 |
| Total | 100.00 | 1,250 |

EXAMPLE VI

| | Percent by wt. | Parts by wt. |
|---|---|---|
| Chlorobutyl rubber (Enjay HT-1066) | 7.55 | 100 |
| Brominated polymethylol phenol resin (Schenectady SP-1055) | .91 | 12 |
| Zinc oxide | .60 | 8 |
| Carbon black | 4.53 | 60 |
| Cast iron grit | 30.21 | 400 |
| Friction particles (hard, heavily filled, vulcanized rubber) | 48.34 | 640 |
| Cellulose floc | 7.86 | 104 |
| Total | 100.00 | 1,324 |

EXAMPLE VII

| | Percent by wt. | Parts by wt. |
|---|---|---|
| Chlorobutyl rubber (Enjay HT-1066) | 7.20 | 100 |
| Accelerator, tetramethylthiuram disulfide ("Tuads") | .07 | 1 |
| Accelerator, tellurium diethyldithiocarbamate ("Tellurac") | .07 | 1 |
| Accelerator, benzothiazyl disulfide ("Altax") | .07 | 1 |
| Stearic acid | .07 | 1 |
| Zinc oxide | .36 | 5 |
| Carbon black | 4.30 | 60 |
| Cast iron grit | 28.76 | 400 |
| Friction particles (hard, heavily filled, vulcanized rubber) | 46.00 | 640 |
| Asbestos fiber (7F04) | 13.10 | 181 |
| Total | 100.00 | 1,390 |

As stated hereinbefore, the halogenated butyl rubber containing molded composition brake blocks of this invention provide certain decided advantages or improved properties, including such fundamental qualities as enhanced frictional characteristics and markedly greater wear life over like products disclosed by the prior art and/or employed in commerce. For instance, brake blocks of the approximate composition of Example II, an optimum formulation due to its relative ease of producing or molding, when compared with commercial composition brake blocks of the approximate composition of that given in Example I of Patent No. 2,861,964 on railroad rolling stock under substantially identical service load and braking conditions were of superior wear life, comparable wet-to-dry friction ratios and of improved and more uniform friction or retarding qualities.

A number of dry stops and wet stops made from 40 miles per hour established the wet-to-dry friction ratio of the improved composition brake blocks to be 1.123 which is comparable to the typical ratios of 1.25 for the said prior commercial products.

Characteristic retardation curves for the brake blocks of the composition of Example II above and the brake blocks of the composition of Example I of Patent No. 2,861,964 are given for stops made from speeds of 100 miles per hour and 40 miles per hour in FIG. 1 and FIG. 2 of the drawing, the curves produced by the composition of this invention being presented in heavy solid lines designated A and the curves produced by the prior compositions under comparable railroad car braking conditions being presented in heavy broken lines designated B, superimposed upon each other. Retardation being directly proportional to frictional characteristics, it is apparent from these curves that the improved friction materials comprising halogenated butyl rubber, or brake blocks thereof, exhibit substantially more uniform and consistent friction characteristics over a broad range of speeds.

The pronounced improvement in prolonged wear life of products of the halogenated butyl rubber bonded compositions of this invention is demonstrated by the comparative data illustrated in the graph comprising FIG. 3 of the drawing. The data presented in the graph of FIG. 3 was derived from identical braking conditions extending over a range of initial speeds of from 40 m.p.h. up to 150 m.p.h. applied to like brake shoes composed of each the composition of Example I of this application and of the preferred and a commercial product of the formula of Example I of U.S. Patent No. 2,861,964, carried out on a large scale dynamometer with a conventional 36 inch railroad car wheel under the equivalent of one wheel load of a standard passenger car and all conditions comparable to and simulating operational railroad braking. In the graph the abscissa axis sets forth the initial speed in miles per hour at which braking is commenced, and the ordinate axis, in logarithmic scale, gives the shoe wear from braking under like, simulated railroad operating conditions from the initial speeds for each the improved composition of this invention and, to applicant's knowledge, the best and most closely akin composition of the prior art. From the graph and data provided thereby wherein the solid line, identified as A, represents the average wear rate of the preferred composition of Example I of this invention and the broken line, identified as B, represents the average wear rate of the composition of Example 1 of U.S. Patent No. 2,861,964, under identical braking conditions, it is clearly evident that throughout the extended range of speeds of from 40 m.p.h. up to 150 m.p.h., the wear rate from braking of the improved composition of this invention is in the order of 2.5 to 3 times less than that of the prior art and commercial product.

The most significant improvement and attribute of this invention, that of reduced wear rate, has been found to be primarily, if not solely attributable to the utilization of halogenated butyl rubber as the principal binder component of the bonding system or phase of the product as is demonstrated by the following relative evaluation of the wear rate of identical compositions, other than that of assorted binders, cures, and proportions therefor. To evaluate a substantial number of compositions a more expeditious test procedure was employed rather than the ponderous, costly and time consuming railroad scale dynamometer. The test apparatus consisted of a revolving arm constructed to carry a friction composition sample at each extremity in such a manner that the sample can be made to contact a flat steel ring of a composition identical to a railroad car wheel. Contact time and speed is variable as desired and can be intermittent or continuous, as given. Contact pressure in all tests was 100 p.s.i. The test conditions and sequence were as follows:

| Phase | Rubbing Speed feet per second | Contact Time per Application | Applications per phase |
|---|---|---|---|
| 1 | 17.6 | 15 sec | 30 intermittent. |
| 2 | 46.8 | 15 sec | 30 intermittent. |
| Drag | 29.4 | 15 min | 1 continuous. |

Phases 1 and 2 simulate intermittent stopping from different speed levels and the drag phase continuous downhill drag under braking load. All phases are carried out in continuous sequence for each sample tested. Equilibrium temperatures reached during the tests averaged approximately 250° F. for phase 1, approximately 400° F. for phase 2, and 500° F. to 700° F. for the simulated downhill drag phase. It should be appreciated that the continuous downhill drag coniditons of uninterrupted braking over a 15 minute period constitutes an unduly demanding test of rigorous terms exceeding the requirements of typical passenger or freight service and is applicable to mountainous terrain.

The composition of Example I, evaluated in simulated railroad scale runs and in the field, served as the standard to determine the relative wear rates of rubber bonds, cures therefor and variable proportions thereof, in products of otherwise identical composition or components. All test friction materials are of the same composition as Example I except as indicated, wherein the given changes consist of the identified variations in the percentage of rubber content of binder phase, cure systems, substitutions of butyl rubbers, and the testing of the compositions of Examples V and VII in the therein stated amount of rubber and the given increased amount. Derived data consist of average coefficient of friction, average rate of wear in cubic inches per horsepower hour. The so-called "standard cure" consists of a thiuram-thiazole sulfurless cure (tetramethylthiuram disulfide, "Tuads," and benzothiazyl disulfide, "Altax") as recommended by the vendor of HT-1066, and as illustrated in Example I. The "resin cure" consists of polymethylolphenol resin as in Example VI.

A further and decided improvement in certain operations such as subway and interurban service is the virtually noiseless operation or braking of the compositions of this invention which eliminate substantially all braking squeals or the like noises other than those produced by the mechanical action of the brake actuating mechanism.

It will be understod that the foregoing details are given for the purpose of illustration, not restriction, and the variations within the spirit of this invention are intended to be included within the scope of the appended claims.

I claim:

1. An improved molded composition brake block having good wet and dry friction characterisics and long service life, comprising approximately 20 to 75% by weight of hard ferrous metal at least 50% of which is in the form of cast iron particles, and at least 50% by volume of the block of non-ferrous inorganic and organic filler and organic binder matrix comprising at least about 2 to up to about 12% by weight of the block of heat resistant vulcanized in situ halogenated butyl rubber which is a halogenated isobutylene-isoprene copolymer.

2. The improved molded composition brake block of claim 1 wherein the binder matrix comprises about 5 to about 12% by weight of the block of heat resistant vulcanized in situ halogenated butyl rubber which is a halogenated isobutylene-isoprene copolymer.

3. An improved molded composition brake block having good wet and dry friction characteristics and long service life, comprising approximately 20 to 75% by weight of hard ferrous metal at least 50% of which is in the form of cast iron particles, from approximately 10 to 60% by weight of long wearing organic friction particles, and from 8 to 35% by weight of a binder matrix comprising the in situ vulcanization product of a composition comprising at least about 2 to up to about 12% by weight of the block of halogenated butyl rubber which is a halogenated isobutylene-isoprene copolymer.

4. The improved molded composition brake block of claim 3 wherein the binder matrix comprising the in situ vulcanization product comprises about 5 to about 12% by weight of the block of at least one halogenated butyl rubber which is a halogenated isobutylene-isoprene copolymer selected from the group consisting of chloro-

TABLE I

| Bond Content, percent | | Test Phase | Chlorobutyl Bond | | | | | | Bromo Butyl Bond | | | | | |
|---|---|---|---|---|---|---|---|---|---|---|---|---|---|---|
| | | | Standard Cure | | | Resin Cure | | | Standard Cure | | | Resin Cure | | |
| Volumetric | Weight | | Avg. Fric. | Avg. Rate Wear | No. Tests | Avg. Fric. | Avg. Rate Wear | No. Tests | Avg. Fric. | Avg. Rate Wear | No. Tests | Avg. Fric. | Avg. Rate Wear | No. Tests |
| 16½ | 6.2 | 1 | .37 | .0040 | 2 | | | | | | | | | |
| | | 2 | .32 | .0071 | 2 | | | | | | | | | |
| | | Drag | .22 | .0484 | 1 | | | | | | | | | |
| | | | Example I—Standard | | | Example VI | | | | | | | | |
| 20 | 7.6 | 1 | .33 | .0042 | 7 | .39 | .0042 | 1 | .36 | .0056 | 2 | .37 | .0047 | 2 |
| | | 2 | .30 | .0061 | 7 | .32 | .0060 | 1 | .32 | .0073 | 2 | .32 | .0065 | 2 |
| | | Drag | .25 | .0650 | 2 | .25 | .2570 | 1 | .24 | .0770 | 2 | .27 | .0648 | 2 |
| 24 | 9.8 | 1 | .40 | .0040 | 2 | .34 | .0044 | 2 | | | | | | |
| | | 2 | .33 | .0050 | 2 | .35 | .0052 | 2 | | | | | | |
| | | Drag | .24 | .6520 | 1 | .28 | .4420 | 1 | | | | | | |
| 27 | 11.3 | 1 | .40 | .0029 | 1 | | | | | | | | | |
| | | 2 | .36 | .0048 | 1 | | | | | | | | | |
| | | Drag | .25 | .7840 | 1 | | | | | | | | | |
| 16½ | 6.2 | 1 | | | | | | | | | | | | |
| | | 2 | | | | | | | | | | | | |
| | | Drag | | | | | | | | | | | | |
| | | | | | | | | | Example V | | | Example VII | | |
| 20 | 7.6 | 1 | | | | | | | .38 | .0067 | 4 | .40 | .0111 | 6 |
| | | 2 | Damaged in run-in | | | Damaged in run-in | | | .33 | .0067 | 4 | .34 | .0088 | 5 |
| | | Drag | | | | | | | .20 | .0071 | 2 | .27 | .0247 | 1 |
| 24 | 9.8 | 1 | .42 | .0165 | 1 | | | | | | | | | |
| | | 2 | | | | | | | | | | | | |
| | | Drag | Destroyed | | | | | | | | | | | |
| 27 | 11.3 | 1 | | | | | | | | | | | | |
| | | 2 | | | | | | | | | | | | |
| | | Drag | | | | | | | | | | | | | butyl rubber, and bromobutyl rubber, and a high proportion of inorganic fillers and vulcanizing ingredients.

5. The improved molded composition brake block of claim 4 wherein the composition comprises asbestos fiber.

6. The improved molded composition brake block of claim 4 wherein the composition comprises organic fiber.

7. An improved molded composition brake block having good wet and dry friction characteristics and long service life, comprising approximately 20 to 75% by weight of hard ferrous metal at least 50% of which is in the form of cast iron particles, from approximately 10 to 60% by weight of long wearing organic friction particles, up to approximately 30% by weight of fiber, and from approximately 8 to 35% by weight of a binder matrix comprising the in situ vulcanization product of a composition comprising at least about 2 to up to about 12% by weight of the block of halogenated butyl rubber which is a halogenated isobutylene-isoprene copolymer and a high proportion of inorganic fillers and vulcanizing ingredients.

8. The improved molded composition brake block of claim 7 wherein the binder matrix comprising the in situ vulcanization product comprises about 5 to about 12% by weight of the block of at least one halogenated butyl rubber which is a halogenated isobutylene-isoprene copolymer selected from the group consisting of chlorobutyl rubber, and bromobutyl rubber, and a high proportion of inorganic fillers and vulcanizing ingredients.

9. The improved molded composition brake block of claim 8 wherein the binder matrix contains up to approximately 6% by weight of the block of thermosetting resin stiffener.

10. The improved molded composition brake block of claim 8 wherein the fiber comprises asbestos.

11. The improved molded composition brake block of claim 8 wherein the fiber comprises organic fiber.

12. The improved molded composition brake block of claim 8 comprising the following in approximate parts by weight:

| | |
|---|---|
| Chlorobutyl rubber which is a halogenated isobutylene-isoprene copolymer | 7.62 |
| Accelerators | 0.16 |
| Stearic acid | 0.08 |
| Zinc oxide | 0.38 |
| Carbon black | 4.56 |
| Cast iron chips | 30.50 |
| Organic friction particles | 48.80 |
| Reinforcing fiber | 7.90 |

References Cited

UNITED STATES PATENTS

| | | | |
|---|---|---|---|
| 2,861,964 | 11/1958 | De Gaugue, et al. | 260—17.4 |
| 2,933,117 | 4/1960 | Baldwin et al. | 260—41.5 |
| 3,152,099 | 10/1964 | De Gaugue | 260—38 |
| 3,344,094 | 9/1967 | De Gaugue | 260—5 |

FOREIGN PATENTS 700,181  11/1953  Great Britain.

DONALD E. CZAJA, *Primary Examiner.*

R. A. WHITE, *Assistant Examiner.*

UNITED STATES PATENT OFFICE
CERTIFICATE OF CORRECTION

Patent No. 3,390,113                                    June 25, 1968

Charles Louis Ernest de Gaugue

It is certified that error appears in the above identified patent and that said Letters Patent are hereby corrected as shown below:

Column 3, line 46, "2,868,140" should read -- 2,686,140 --.
Column 7, line 20, "conidtions" should read -- conditions --.

Signed and sealed this 24th day of February 1970.

(SEAL)
Attest:

Edward M. Fletcher, Jr.                            WILLIAM E. SCHUYLER, JR.
Attesting Officer                                    Commissioner of Patents